United States Patent
Yang et al.

(10) Patent No.: US 8,218,314 B2
(45) Date of Patent: Jul. 10, 2012

(54) COVER MECHANISM AND ELECTRONIC DEVICE USING SAME

(75) Inventors: Mu-Wen Yang, Taipei Hsien (TW); Chih-Chiang Chang, Taipei Hsien (TW); Chia-Wei Hu, Taipei Hsien (TW)

(73) Assignee: FIH (Hong Kong) Limited, Kowloon (HK)

( * ) Notice: Subject to any disclaimer, the term of this patent is extended or adjusted under 35 U.S.C. 154(b) by 717 days.

(21) Appl. No.: 12/339,274

(22) Filed: Dec. 19, 2008

(65) Prior Publication Data
US 2009/0270145 A1    Oct. 29, 2009

(30) Foreign Application Priority Data
Apr. 25, 2008   (CN) .......................... 2008 1 0301305

(51) Int. Cl.
*H05K 5/00* (2006.01)
(52) U.S. Cl. ......... 361/679.58; 361/679.56; 361/679.01; 361/679.55; 361/749; 439/136; 439/139; 439/140; 439/147
(58) Field of Classification Search ............... 455/575.3, 455/575.4, 575.8, 575.1; 439/136, 139, 140, 439/147, 149; 361/816, 679.01, 679.55, 361/749
See application file for complete search history.

(56) References Cited

U.S. PATENT DOCUMENTS

| | | | | |
|---|---|---|---|---|
| 6,371,535 | B2 * | 4/2002 | Wei et al. ...................... | 292/175 |
| 7,572,993 | B2 * | 8/2009 | Chen et al. ................. | 200/302.1 |
| 7,611,371 | B2 * | 11/2009 | Guo .............................. | 439/367 |
| 7,800,891 | B2 * | 9/2010 | Shi et al. ................... | 361/679.01 |
| 7,813,112 | B2 * | 10/2010 | Ge et al. ................... | 361/679.01 |
| 7,855,884 | B2 * | 12/2010 | Dong ........................ | 361/679.58 |
| 7,885,058 | B2 * | 2/2011 | Li et al. ..................... | 361/679.01 |
| 8,118,335 | B2 * | 2/2012 | Hu et al. ....................... | 292/254 |
| 2009/0141445 | A1 * | 6/2009 | Lu ............................. | 361/679.55 |
| 2009/0225520 | A1 * | 9/2009 | Shi et al. ....................... | 361/728 |
| 2009/0270144 | A1 * | 10/2009 | Yang et al. ................. | 455/575.3 |
| 2009/0314044 | A1 * | 12/2009 | Yang et al. ...................... | 70/158 |

FOREIGN PATENT DOCUMENTS
CN       2852232 Y    12/2006
JP       2001-210972 A    8/2001

* cited by examiner

*Primary Examiner* — Linh Nguyen
(74) *Attorney, Agent, or Firm* — Altis Law Group, Inc.

(57) ABSTRACT

An electronic device using a cover mechanism to cover a hole is described. The cover mechanism includes a base member, a cover member and a retaining member. The cover member is fixed with the retaining member and moves between a closed position and an opened position. In the closed position, the cover member is elastically, partially deformed to lock to the base member. In the opened position, the cover member can be elastically bent to expose the hole while still being physically attached to the base member.

14 Claims, 5 Drawing Sheets

COVER MECHANISM AND ELECTRONIC DEVICE USING SAME

BACKGROUND

1. Technical Field

The exemplary embodiment relates to cover mechanisms used in electronic devices.

2. Description of Related Art

Electronic devices usually have external interfaces (e.g., universal serial bus (USB)) for electrically connecting peripheral devices (e.g., printers), accessories (e.g., USB flash drives) or other electronic devices. Such external interfaces should be protected by cover mechanisms from e.g., dust or water, to maintain proper functioning.

The cover mechanisms usually include covers with locks. The covers are typically locked to the electronic devices by latches to cover the area through which the interfaces of electronic devices are exposed. However, the covers are often not permanently attached to the electronic device. Thus, the covers may easily be misplaced or lost when not locked to the electronic devices.

Therefore, there is room for improvement within the art.

BRIEF DESCRIPTION OF THE DRAWINGS

Many aspects of the exemplary cover mechanism and electronic device using the cover mechanism can be better understood with reference to the following drawings. These drawings are not necessarily drawn to scale, the emphasis instead being placed upon clearly illustrating the principles of the exemplary cover mechanism and the electronic device. Moreover, in the drawings like reference numerals designate corresponding parts throughout the several views. Wherever possible, the same reference numbers are used throughout the drawings to refer to the same or like elements of an embodiment.

DETAILED DESCRIPTION OF THE EMBODIMENTS

Figure 1:
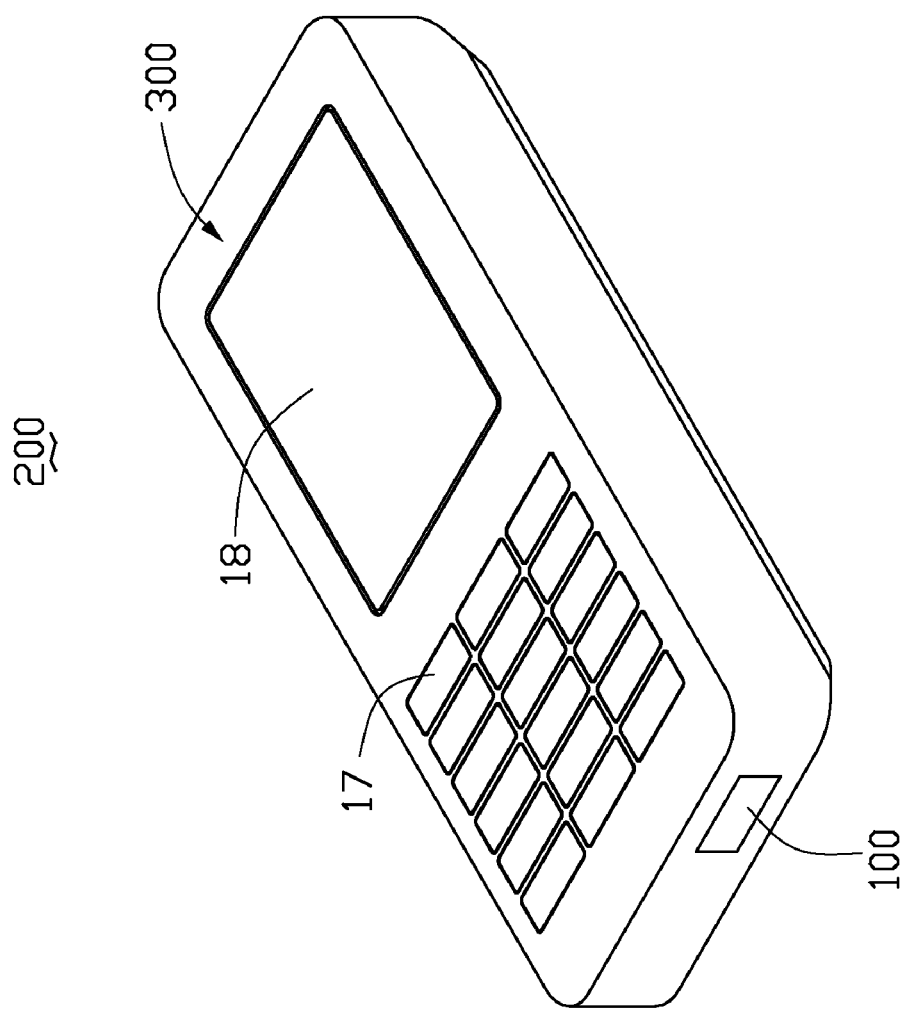
FIG. 1 is an isometric view of an electronic device including an exemplary cover mechanism.

FIG. 1 shows an exemplary electronic device 200 (such as a mobile phone) including an housing 300, a keypad 17, a display 18, and a cover mechanism 100.

Figure 2:
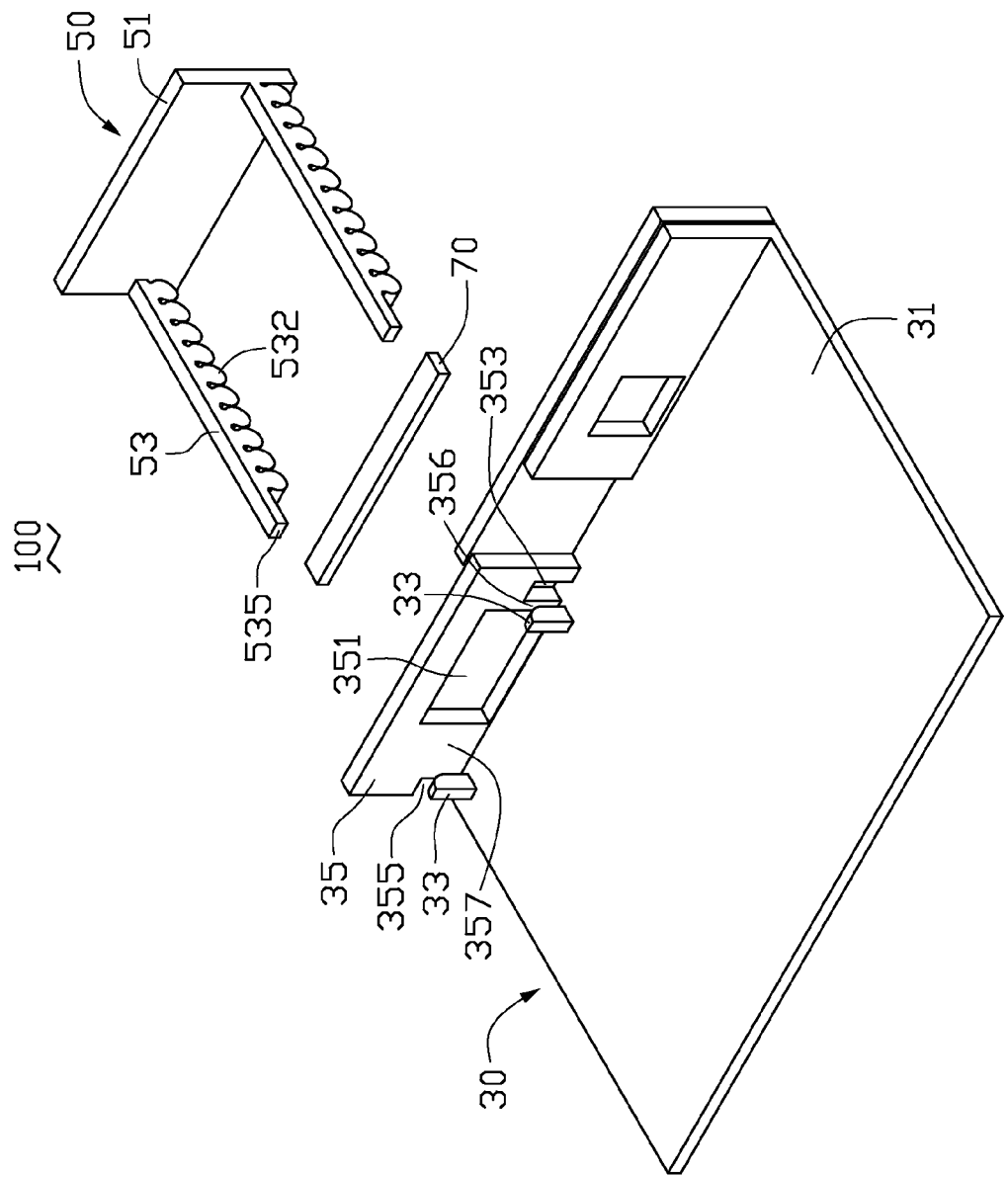
FIG. 2 is an exploded and isometric view of the cover mechanism shown in FIG. 1.

Referring to FIG. 2, the cover mechanism 100 includes a base member 30, a cover member 50, and a retaining member 70. The base member 30 may be portions of the housing 300 and includes a bottom wall 31 and a sidewall 35 perpendicular to the bottom wall 31. The cover member 50 may be locked to the base member 30 and cover a hole 351 (e.g., a connector interface hole) defined in the sidewall 35.

A portion of the sidewall 35 defines a rectangular cutout 353 and a rectangular notch 355. The cutout 353 and the notch 355 are located at two sides of and near the hole 351 and a first connecting portion 356 of the sidewall 35 separating the cutout 353 and the hole 351, and a second connecting portion 357 of the sidewall 35 separating the notch 355 and the hole 351. The bottom wall 31 forms two columnar blocking members 33 adjacent to the sidewall 35. The two blocking members 33 align with the first connecting portion 356 and the second connecting portion 357, respectively.

The retaining member 70 is a substantially rectangular bar. The retaining member 70 is configured to fix to the cover member 50 and move along with the cover member 50 to abut the blocking members 33.

The cover member 50 includes a cover portion 51 and two elastic arms 53. The cover portion 51 is configured to cover the hole 351 when the cover member 50 locks to the base member 30. The arms 53 may be made of rubber, soft plastic or other elastic materials and configured to slide through the cutout 353 and the notch 355. The arms 53 are slightly larger than the cutout 353 and the notch 355 to create friction. The arms 53 protrude substantially parallelly outward from an inner surface of the cover portion 51. Each arm 53 forms a plurality of elastic sliding portions 532. The retaining member 70 may be fixed (e.g., adhered) to the distal ends 535 of the arms 53.

Figure 3:
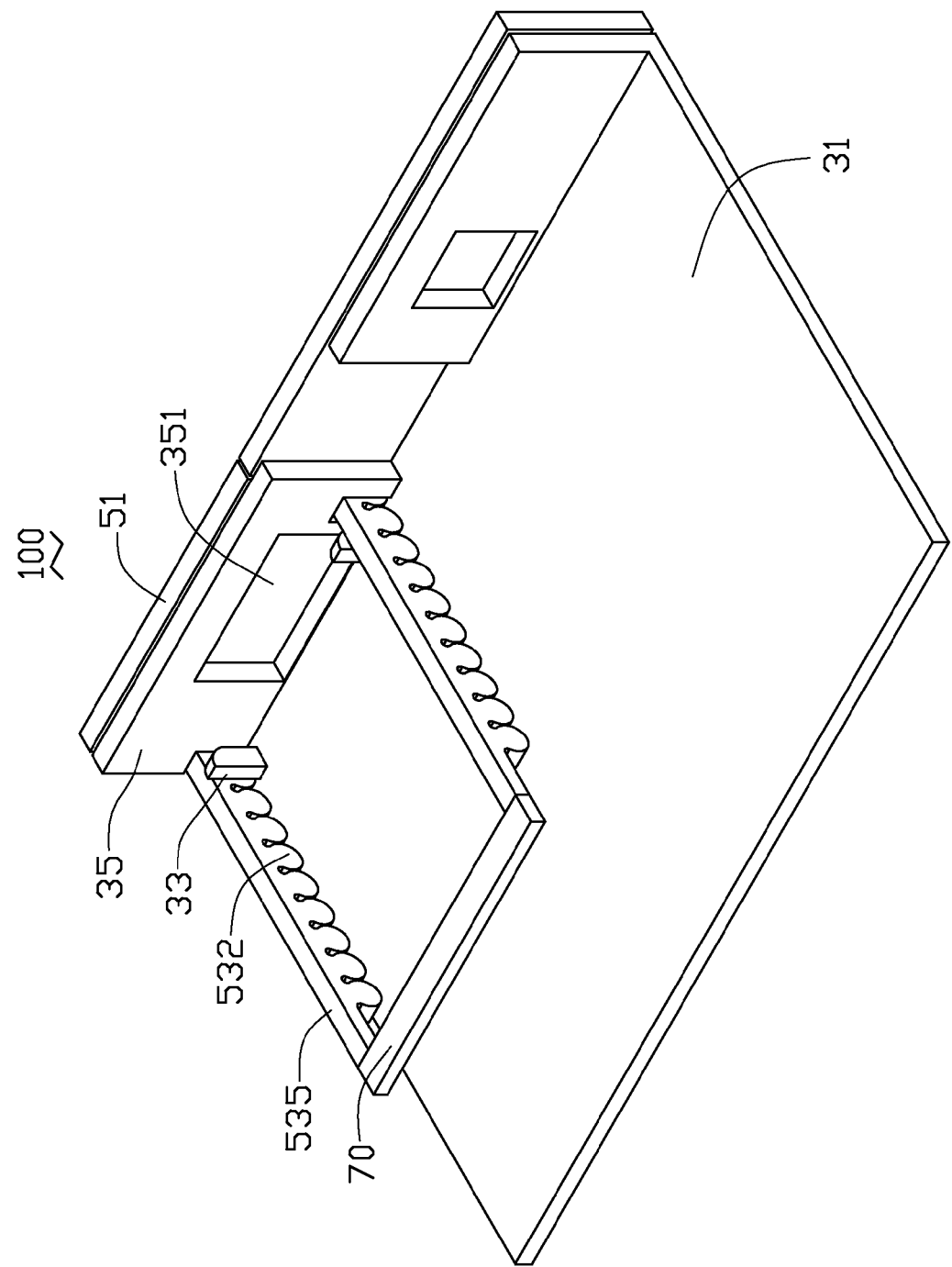
FIG. 3 is an isometric view of the cover mechanism shown in FIG. 1 in a closed position.
Figure 4:
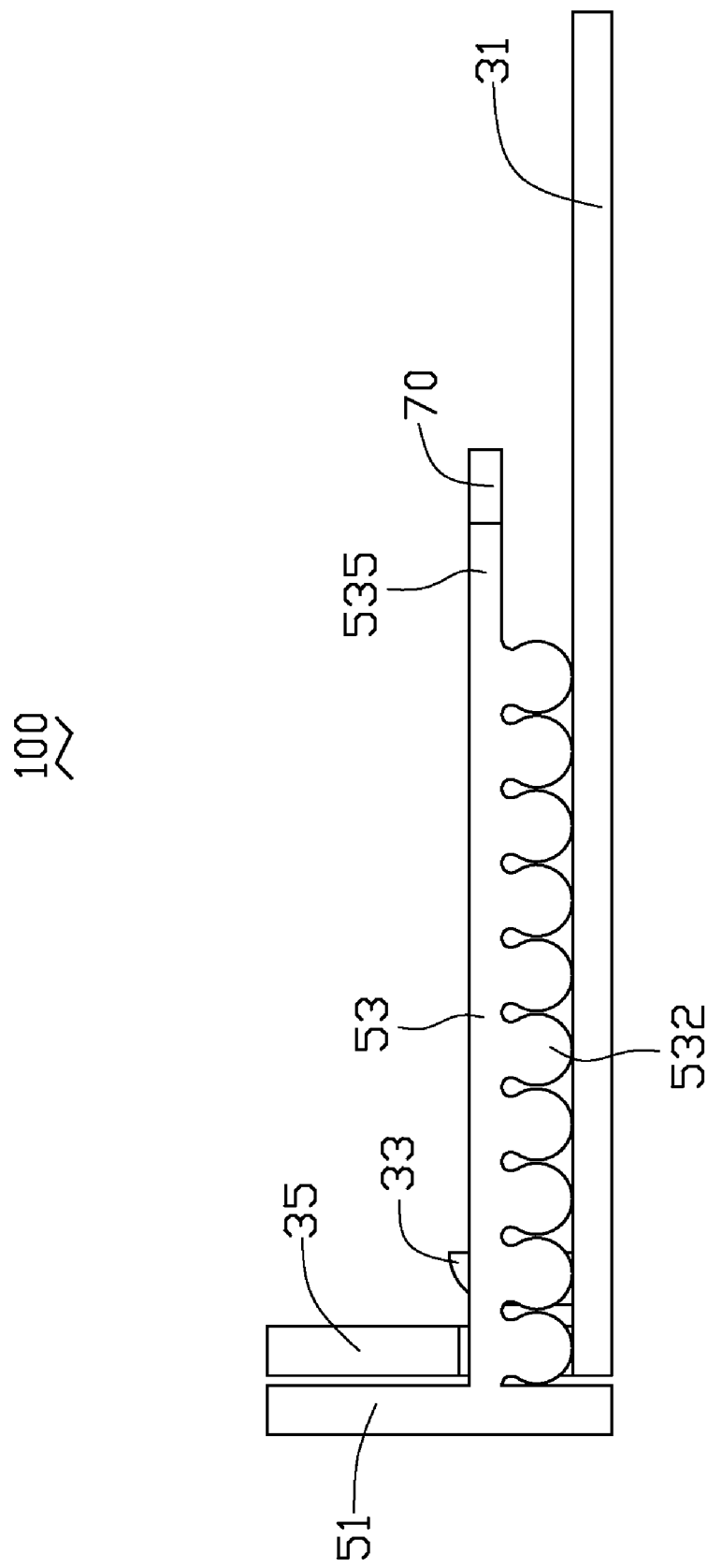
FIG. 4 is a cross sectional view of the cover mechanism shown in FIG. 3.

In FIGS. 3 and 4, the cover mechanism 100 is locked in a closed position, and the cover portion 51 covers the hole 351. The cover member 50 locks to the base member 30. To achieve this locking state, the cover member 50 is pushed towards the base member 30, so that the arms 53 slide through the cutout 353 and the notch 355 inside the electronic device 200 until the cover portion 51 abuts the sidewall 35. At this time, because the arms 53 are slightly larger than the cutout 353 and the notch 355, the arms 53 are slightly, elastically compressed and frictionally secured within the cutout 353 and the notch 355. In this position, the retaining member 70 is spaced from the blocking members 33.

Figure 5:
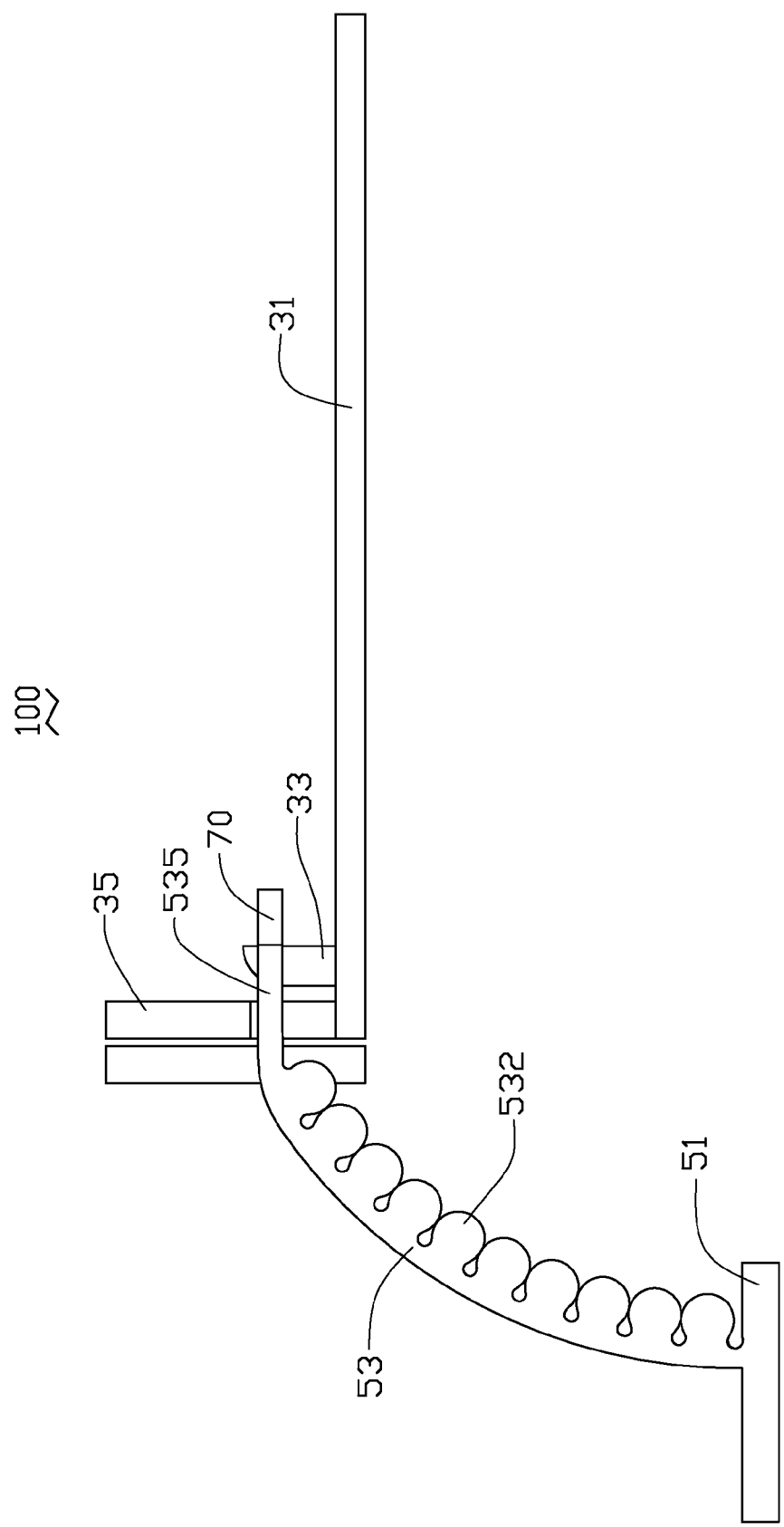
FIG. 5 is similar to FIG. 4, but in an opened position.

FIG. 5 shows a process of transferring the cover mechanism 100 from the closed position to an opened position. The cover member 50 is pulled outwardly along the longitudinal axis of the members 53, whereby the arms 53 reversely slide through the cutout 353 and the notch 355, enabling the retaining member 70 to move towards the blocking members 33. When the retaining member 70 abuts the blocking members 33, the cover member 50 stops its movement. This movement exposes the hole 351 from the cover portion 51. By the abutting of the retaining member 70 and the blocking members 33, the cover member 50 cannot move any further. By bending the arms 53 downwardly, the hole 351 may be more completely exposed e.g., for insertion of one of various kinds of plugs (see FIG. 5).

To close and lock the cover mechanism 100, the above process is reversed and the cover member 50 moved from the opened position to the closed position. The closing process ends when the cover portion 51 abuts the sidewall 35.

It is to be understood, however, that even through numerous characteristics and advantages of the exemplary invention have been set forth in the foregoing description, together with details of the structure and function of the invention, the disclosure is illustrative only, and changes may be made in detail, especially in matters of shape, size, and arrangement of parts within the principles of the invention to the full extent indicated by the broad general meaning of the terms in which the appended claims are expressed.

What is claimed is:

1. A cover mechanism for covering a hole of an electronic device, the cover mechanism comprising:
   a base member;
   a retaining member; and
   a cover member fixed with the retaining member and configured for movement between:
   a closed position, where the cover member is deformed to lock to the base member; and an opened position, where the cover member can be elastically bent to expose the hole while still being physically attached to the base member by abutting of the retaining member against the base member;

the cover member comprising two elastic arms, each of the arms forming a plurality of teeth-shaped elastic continuously-connected sliding portions, the sliding portions configured to be elastically deformed to lock the cover member to the base member.

2. The cover mechanism as claimed in claim 1, wherein the base member defines a cutout and a notch, the elastic arms are slightly larger than the cutout and the notch, and the sliding portions are configured to slide through to lock within the cutout and the notch.

3. The cover mechanism as claimed in claim 2, wherein the cover member further comprises a cover portion configured to cover the hole, the arms protruding substantially parallelly outward from the cover portion.

4. The cover mechanism as claimed in claim 2, wherein each arm has a distal end configured for fixing the retaining member.

5. The cover mechanism as claimed in claim 4, wherein:
the base member comprises a bottom wall and a sidewall;
the cutout, the notch and the hole defined through the sidewall, the hole located between the notch and the cutout, thereby defining a first connecting portion separating the cutout and the hole, and a second connecting portion separating the notch and the hole; and
the bottom wall forming two blocking members adjacent to the sidewall, the two blocking members aligning to the first connecting portion and the second connecting portion.

6. The cover mechanism as claimed in claim 5, wherein the retaining member is configured to move with the cover member to abut the blocking members.

7. The cover mechanism as claimed in claim 6, wherein the retaining member is a substantially rectangular bar.

8. An electronic device, comprising:
a housing defining an hole;
a cover mechanism, comprising:
a base member being a portion of the housing;
a retaining member; and
a cover member fixed with the retaining member and configured for movement between:
a closed position, where the cover member is deformed to lock to the base member; and
an opened position, where the cover member can be elastically bent to expose the hole while still being physically attached to the base member by abutting of the retaining member against the base member;

the cover member comprising two elastic arms, each of the arms forming a plurality of teeth-shaped elastic continuously-connected sliding portions, the sliding portions configured to be elastically deformed to lock the cover member to the base member.

9. The electronic device as claimed in claim 8, wherein the base member defines a cutout and a notch, the elastic arms are slightly larger than the cutout and the notch, and the sliding portions are configured to slide through to lock within the cutout and the notch.

10. The electronic device as claimed in claim 9, wherein the cover member further comprises a cover portion configured to cover the hole, the arms protruding substantially parallelly outward from the cover portion.

11. The electronic device as claimed in claim 9, wherein each arm has a distal end configured for fixing the retaining member.

12. The electronic device as claimed in claim 11, wherein:
the base member comprises a bottom wall and a sidewall;
the cutout, the notch and the hole defined through the sidewall, the hole located between the notch and the hole, thereby defining a first connecting portion separating the cutout and the cutout, and a second connecting portion separating the notch and the hole; and
the bottom wall forming two blocking members adjacent to the sidewall, the two blocking members aligning to the first connecting portion and the second connecting portion.

13. The electronic device as claimed in claim 12, wherein the retaining member is configured to move with the cover member to abut the blocking members.

14. The electronic device as claimed in claim 13, wherein the retaining member is a substantially rectangular bar.

* * * * *